United States Patent [19]
Gallitzendoerfer et al.

[11] Patent Number: 4,591,204
[45] Date of Patent: May 27, 1986

[54] STRUCTURE FOR AN AUTOMOTIVE VEHICLE BODY

[75] Inventors: Joseph Gallitzendoerfer, Sindelfingen; Peter Pfeiffer, Boeblingen; Johann Tomforde, Sindelfingen; Ferdinand Hellhake, Stuttgart, all of Fed. Rep. of Germany

[73] Assignee: Daimler-Benz Aktiengesellschaft, Stuttgart, Fed. Rep. of Germany

[21] Appl. No.: 600,816

[22] Filed: Apr. 16, 1984

[30] Foreign Application Priority Data

Apr. 15, 1983 [DE] Fed. Rep. of Germany ....... 3313658

[51] Int. Cl.$^4$ ............................................. B60J 5/00
[52] U.S. Cl. ..................................... 296/202; 296/146
[58] Field of Search ...................... 296/202, 185, 31 P, 296/146, 1 R

[56] References Cited

U.S. PATENT DOCUMENTS

| | | | |
|---|---|---|---|
| 1,886,974 | 11/1932 | Perry | 296/202 |
| 2,733,096 | 1/1956 | Waterhouse | 296/202 |
| 2,860,911 | 11/1958 | Cotter | 296/202 |
| 4,405,173 | 9/1983 | Piano | 296/146 |

Primary Examiner—Robert R. Song
Attorney, Agent, or Firm—Barnes & Thornburg

[57] ABSTRACT

An automotive vehicle body having side windows separated by a column is provided with an adjustable cover for the column which is aligned with the outer surfaces of the window. The cover is made from glass, light-permeable synthetic resin, or the like. Transverse adjustment is provided to facilitate alignment with the window surfaces. Gaskets are provided to seal adjoining doors.

6 Claims, 3 Drawing Figures 4,591,204

STRUCTURE FOR AN AUTOMOTIVE VEHICLE BODY

BACKGROUND AND SUMMARY OF THE INVENTION

The present invention relates to vehicle bodies, and more particularly to vehicle bodies having side windows separated by a central column.

In such bodies, the central column is generally above a side panel or door panel of the vehicle body so that it forms part of the outer surface of the body. In these cases, expensive machine and finishing operations to the outer surfaces of the column are required. Adjustment of doors adjoining the column is difficult and time consuming since perfect alignment of the doors with the column is desirable.

A door post made of glass for an automotive vehicle is known from Germany utility model No. 1,473,527. However, the structure described there is not suitable for use in a modern self supporting steel vehicle body and, moreover, would not afford the advantages attained by the present invention (e.g., simplifying machine operations, freedom of structural design, and compensation of tolerances).

Accordingly, an object of the present invention is to provide a structure for an automotive vehicle body which avoids the drawbacks described above while simultaneously allowing for extensive freedom in the structural design of the central column, simplifying manufacturing and fitting operations, and improving the outer appearance of the vehicle body.

This object is attained in a vehicle body of the type described above by providing a cover for the outer surface of the column. The outer surface of the cover is aligned with the outer surfaces of the adjacent side windows. The cover may be made from glass or other appropriate material, such as a light-permeable synthetic resin.

In a preferred embodiment, the spacing between the cover and the column is adjustable to facilitate tolerance compensation. Especially advantageous embodiments of the invention include the provision of gaskets and sealing members which abut or contact other portions of the vehicle body.

Further objects, features, and advantages of the present invention will become more apparent from the following description when taken with the accompanying drawings which show, for purposes of illustration only, embodiments in accordance with the present invention.

DETAILED DESCRIPTION OF THE DRAWINGS

Figure 1:
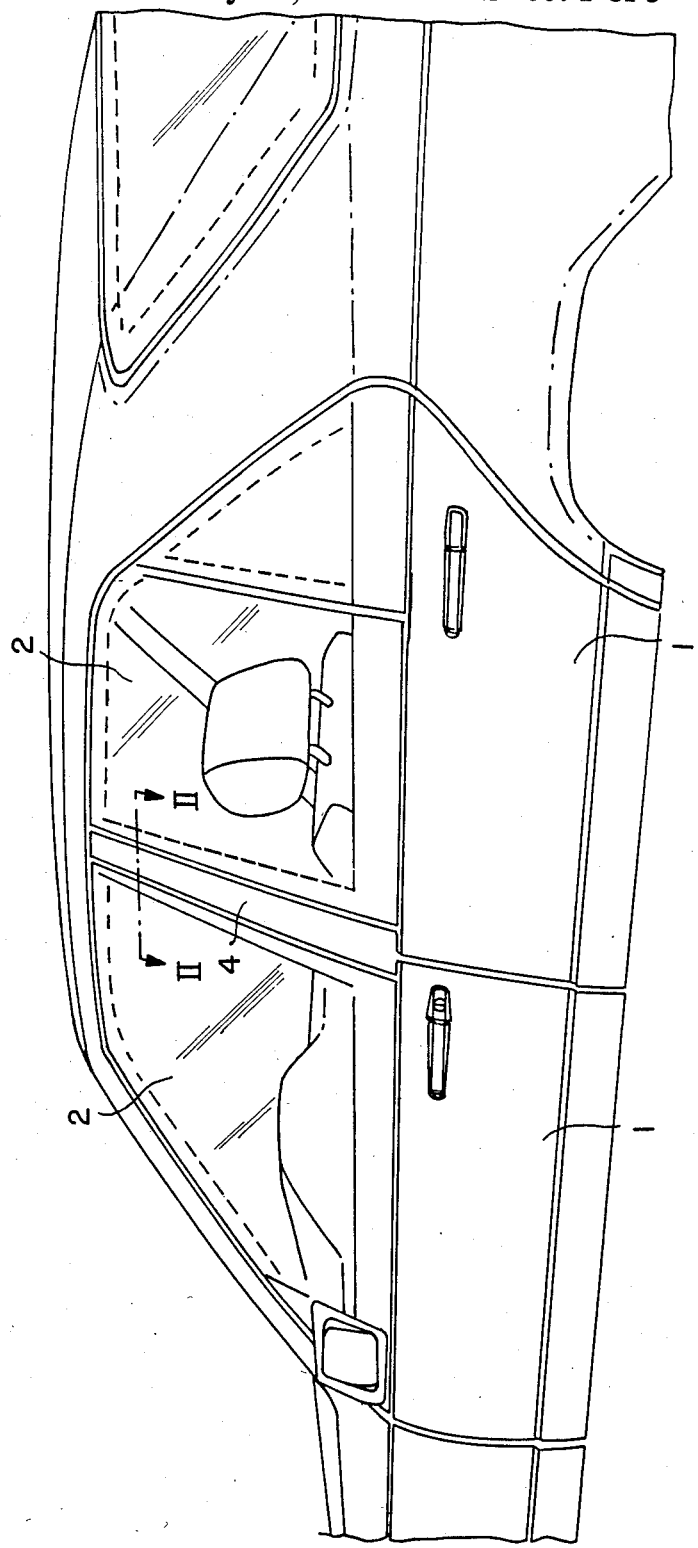
FIG. 1 shows a side view of an automotive vehicle body with covered column according to the present invention.

In FIG. 1 of the drawings, part of a side view of a passenger automobile is shown in perspective illustration. The vehicle body comprises two doors 1 having two windows 2. Between windows 2, central column 3 (See FIGS. 2 and 3) is provided with cover 4 of glass, a light-permeable synthetic resin, or the like. The construction and mounting of the cover will be described in greater detail with reference to the additional figures.

Figure 2:
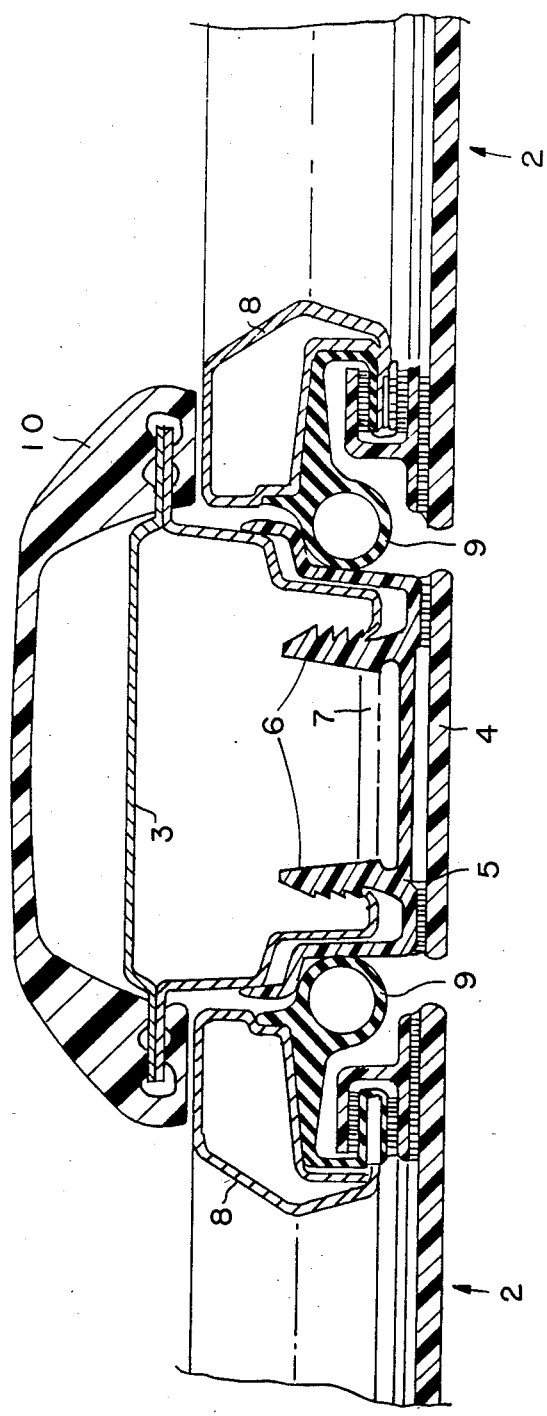
FIG. 2 shows an enlarged cross-section taken along line II—II of FIG. 1.

In the embodiment of the invention illustrated in FIG. 2, cover 4 is cemented to a generally U-shaped supporting member 5 which is made from a synthetic resin. Clips 6, having a series of sequentially arranged teeth formed on one surface, are molded to supporting member 5. These teeth engage an edge of recess 7 provided in column 3 to attach cover 4 to column 3 at a desired spacing. Accordingly, alignment of the cover 4 with the laterally adjoining windows 2 of doors 1 can be attained. To provide a seal between the column 3 and adjoining doors 1, hollow gasket 9 is attached to door frames 8. The side of column 3 facing the interior of the vehicle is covered by molding 10 made of foamed plastic.

Figure 3:
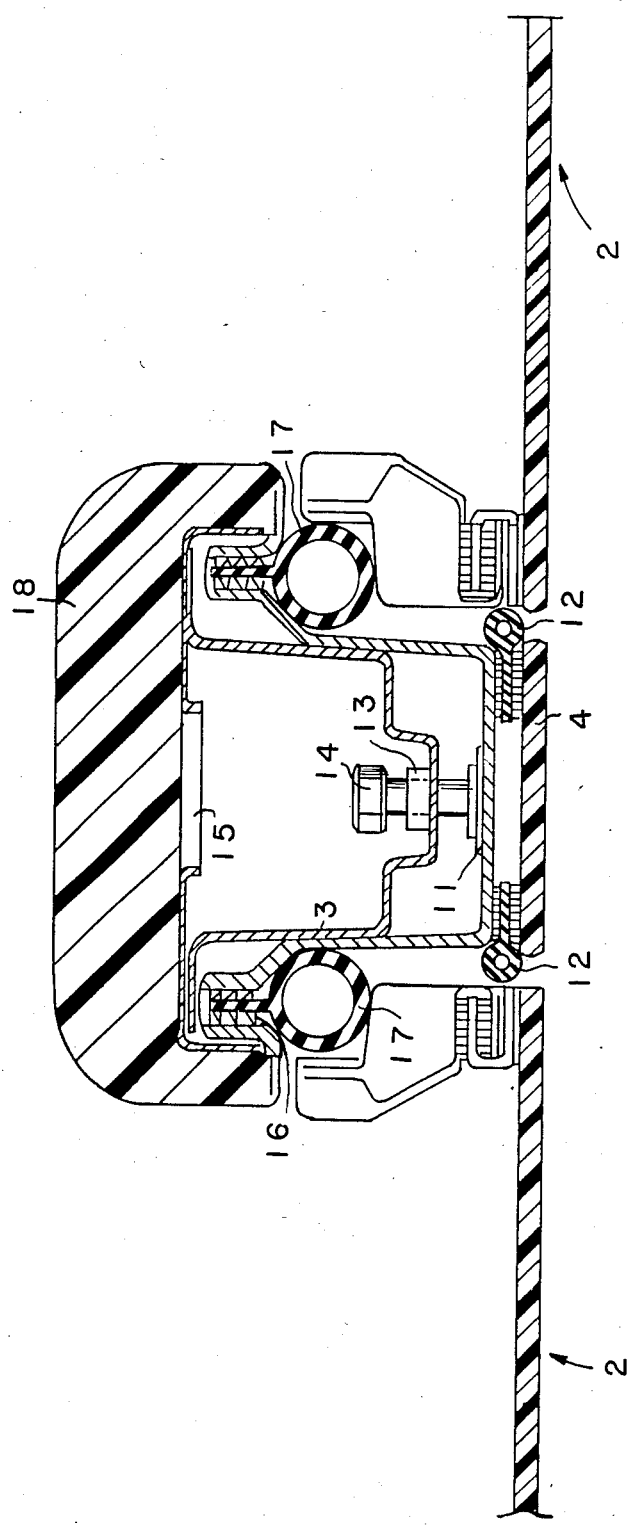
FIG. 3 shows a cross-section taken along line II—II in FIG. 1 of another embodiment of the present invention.

Another embodiment of the invention is shown in FIG. 3. In this embodiment, the externally located cover 4 of column 3 is cemented to U-shaped supporting member 11 with the interposition of a sealing member 12. Supporting member 11 is adjustably mounted to column 3 by way of a screw connection. This is done by attaching to column 3 weld nut 13 which receives screw 14 which is accessible from the vehicle interior by way of cutout 15 in column 3. Screw 14 is attached at its end to supporting member 11 (for example, by a clip) in such a manner as to allow rotation of the screw with respect to member 11. Screw 14 thus pushes or pulls member 11 in a transverse direction, with respect to the vehicle body, to allow for adjustment of cover 4.

The free ends (i.e., the legs) of U-shaped supporting member 11 are bent backwards toward the outside of the vehicle body by 180° F., as shown in FIG. 3, to form two channels 16. Each channel 16 accommodates gasket 17 which provides a seal to adjoining door 1.

The surface of column 3 facing the inside of the vehicle is also covered by a foamed lining 18.

At cementing sites and all other zones where something is to be hidden, the inside of the window panes can be coated with ceramic-containing screen print.

This is accomplished by providing a stippling pattern, color lightening, or other transition pattern which terminates in the transparent zone of the window and, thus, provides for a transition between the outer vehicle body finish and the upholstery color.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Structure of an automotive vehicle body, comprising:
   body means;
   first window means supported on said body means;
   second window means supported on said body means such that an outer surface of an edge portion of said second window means is aligned with, but separated by a space from, an outer surface of an edge portion of said first window means;
   a column supported on said body means adjacent to said space separating said first and second window means; and
   a cover disposed in said space and attached to said column such that an outer surface of said cover is aligned with said outer surfaces of said edge portions of said first and second window means, said cover attached to said column being spaced apart from said column and said spacing being adjustable.

2. Structure of an automotive vehicle body, comprising:

body means;

first window means supported on said body means;

second window means supported on said body means such that an outer surface of an edge portion of said second window means is aligned with, but separated by a space from, an outer surface of an edge portion of said first window means;

a column supported on said body means adjacent to said space separating said first and second window means; and a cover disposed in said space and attached to said column such that an outer surface of said cover is aligned with said outer surfaces of said edge portions of said first and second window means, said cover being attached to a generally U-shaped member, and said U-shaped member being attached to said column, a channel being formed in a leg of said U-shaped member and gasket means being disposed in said channel for providing a seal to an adjoining portion of said vehicle body.

3. Structure of an automotive vehicle body, comprising:

body means;

first window means supported on said body means;

second window means supported on said body means such that an outer surface of an edge portion of said second window means is aligned with, but separated by a space from, an outer surface of an edge portion of said first window means;

a column supported on said body means adjacent to said space separating said first and second window means; and a cover disposed in said space and attached to said column such that an outer surface of said cover is aligned with said outer surfaces of said edge portions of said first and second window means, said cover being attached to a generally U-shaped member, and said U-shaped member being attached to said column, wherein channels are formed in both legs of said U-shaped member and gasket means are disposed in both of said channels.

4. Structure of an automotive vehicle body, comprising:

body means;

first window means supported on said body means;

second window means supported on said body means such that an outer surface of an edge portion of said second window means is aligned with, but separated by a space from, an outer surface of an edge portion of said first window means;

a column supported on said body means adjacent to said space separating said first and second window means; and a cover disposed in said space and attached to said column such that an outer surface of said cover is aligned with said outer surfaces of said edge portions of said first and second window means, said cover being attached to a generally U-shaped member, and said U-shaped member being attached to said column by a clip having a plurality of serially disposed teeth which act to grip a recess in said column.

5. Structure of an automotive vehicle body, comprising:

body means;

first window means supported on said body means;

second window means supported on said body means such that an outer surface of an edge portion of said second window means is aligned with, but separated by a space from, an outer surface of an edge portion of said first window means;

a column supported on said body means adjacent to said space separating siad first and second window means; and a cover disposed in said space and attached to said column such that an outer surface of said cover is aligned with said outer surfaces of said edge portions of said first and second window means, said cover being attached to a generally U-shaped member, and said U-shaped member being attached to said column, and wherein a gasket attached to an adjoining portion of said vehicle body contacts a side of said U-shaped member.

6. Structure of an automotive vehicle body, comprising:

body means;

first window means supported on said body means;

second window means supported on said body means such that an outer surface of an edge portion of said second window means is aligned with, but separated by a space from, an outer surface of an edge portion of said first window means;

a column supported on said body means adjacent to said space separating said first and second window means; and a cover disposed in said space and attached to said column such that an outer surface of said cover is aligned with said outer surfaces of said edge portions of said first and second window means, said cover being attached to a generally U-shaped member, and said U-shaped member being attached to said column, said cover being attached to said U-shaped member by an adhesive bond, and wherein a sealing member is interposed in said adhesive bond between said U-shaped member and said cover.

* * * * *